(12) United States Patent
Deng et al.

(10) Patent No.: US 7,072,145 B2
(45) Date of Patent: Jul. 4, 2006

(54) FLYING HEAD SLIDER WITH AIR BEARING STEP FACE ARRANGEMENT

(75) Inventors: Zhisheng Deng, Osaka (JP); Yoshihiro Ueno, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 382 days.

(21) Appl. No.: 10/665,341

(22) Filed: Sep. 18, 2003

(65) Prior Publication Data
US 2004/0100732 A1   May 27, 2004

(30) Foreign Application Priority Data
Sep. 26, 2002   (JP) .............................. 2002-280984

(51) Int. Cl.
G11B 5/60   (2006.01)
G11B 21/21   (2006.01)

(52) U.S. Cl. ................. 360/235.5; 360/235.6; 360/235.7; 360/236

(58) Field of Classification Search ............ 360/235.5, 360/235.6, 235.7, 236, 235.8
See application file for complete search history.

(56) References Cited

U.S. PATENT DOCUMENTS 5,345,353 A * 9/1994 Krantz et al. ............ 360/236.6
5,424,888 A * 6/1995 Hendriks et al. ........ 360/236.8
2001/0053046 A1   12/2001 Koishi
2003/0090833 A1 * 5/2003 Tani et al. ................. 360/110
2004/0150914 A1 * 8/2004 Tsuchiyama et al. ..... 360/235.6

FOREIGN PATENT DOCUMENTS

EP   0 631 281 A2   12/1994
EP   0 854 472 A1   7/1998
WO   WO 01/91122 A2   11/2001

OTHER PUBLICATIONS

Ni Sheng et al., "Slider and HGA Designs for Both Smooth Load/Unload Operation and High Shock Resistance", 2002 IEEE International Mag. Con.
Wei Hua et al., "Further Studies of Unload Process with a 9D Model", IEEE Transactions on Magnetics, vol. 37, No. 4, Jul. 2001, pp. 1855-1858.
Wei Hua et al., "ABS Designs for Load/Unload and Shock Resistance", IEICE Trans. Electron, vol. E85-C, No. 10, Oct. 2002, pp. 1789-2002.
Australian Search Report corresponding to application No. SG 200305615-7 dated Apr. 8, 2005.

* cited by examiner

Primary Examiner—Craig A. Renner
(74) Attorney, Agent, or Firm—RatnerPrestia

(57) ABSTRACT

A flying head slider includes a first air bearing having plural step-faces and being prepared on a base surface at air inflow side, and a second air bearing being prepared on the base surface at air outflow side. The upper most surface of the second air bearing is lower than the upper most surface of the first air bearing.

12 Claims, 13 Drawing Sheets

Air inflow direction →

|  | Present invention | Comparison sample |
|---|---|---|
| LA | 600 | 600 |
| L1 | 60 | No second step-face |
| L2 | 15 | 15+60 |

Unit :nm

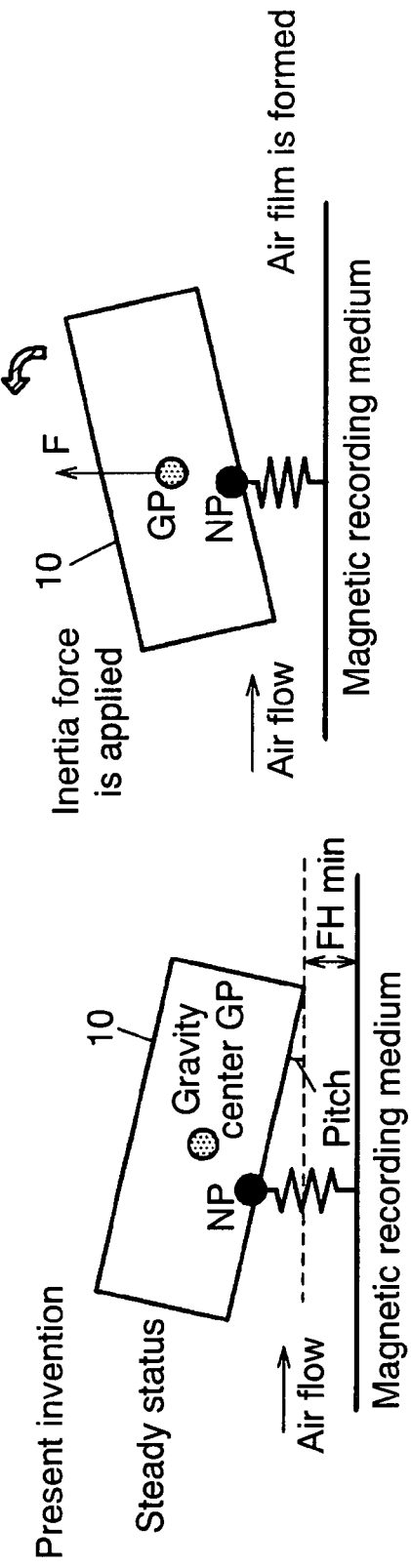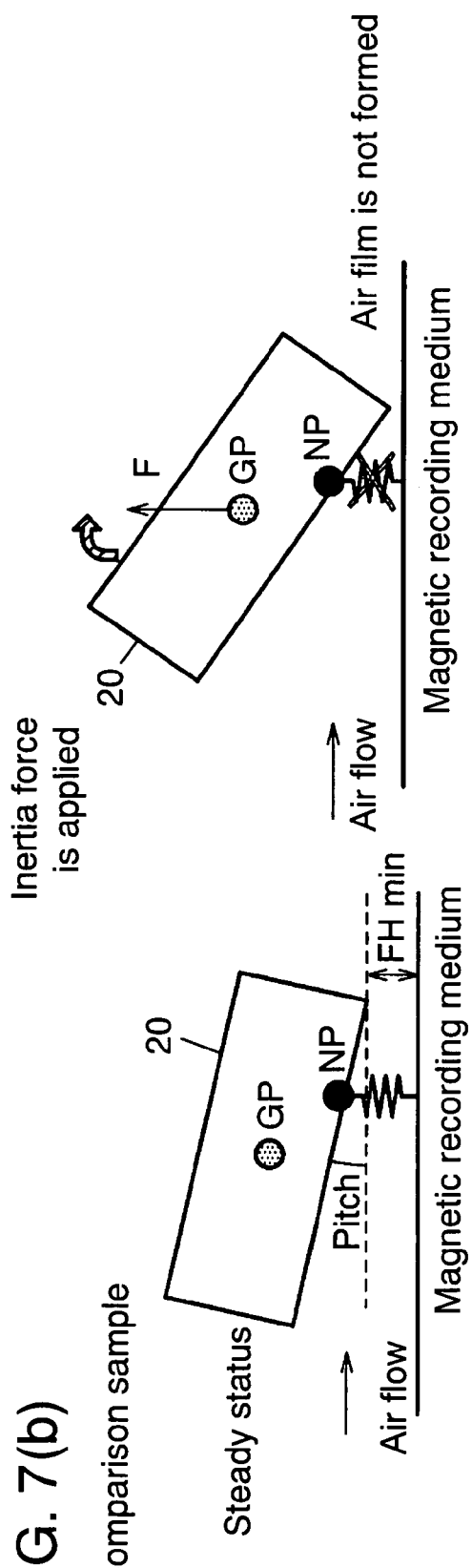
FIG. 7(a) Present invention
FIG. 7(b) Comparison sample

FLYING HEAD SLIDER WITH AIR BEARING STEP FACE ARRANGEMENT

FIELD OF THE INVENTION

The present invention relates to flying head-sliders, head supporting devices using the same head slider, and disc driving devices such as magnetic disc driving devices.

BACKGROUND OF THE INVENTION

A variety of techniques about flying head-sliders, which are used in disc driving devices such as a magnetic disc driving device, have been proposed. Particularly in these years, devices which employ the flying head-slider have been downsized, and densities of recording media have become higher, so that a magnetic head needs to be closer to the recording media. This environment requires the flying head-slider to have a fly height as low as several tens of nano-meter over a recording medium.

Therefore, an external shock onto a disc driving device will cause the head slider to collide against the recording medium, and damages the medium magnetically or mechanically, so that the medium cannot be used anymore for recording or reproducing data. Further, a mobile information apparatus have recently gained popularity, so that the disc driving device mounted in such an apparatus needs to be portable. The portable disc driving device is thus subject to being dropped.

Amid the foregoing problems, various studies have been made on a surface-shape (hereinafter referred to as an air bearing surface), which is to be faced to a recording medium, of a highly shock resistant flying head-slider.

For instance in a conventional case, when an inertia force along the direction of moving away from the recording medium is applied to the head slider, the head slider moves so away from the medium that an elastic force (a restoring force to an original status from a bent status) of a suspension spring, which tries to retain the head slider, acts on the head slider to return toward the medium. The head slider, in the end, possibly collides against the medium, thereby damaging the medium magnetically or mechanically. In order to overcome this problem, a negative pressure generating section is prepared on the air bearing surface of the flying head-slider. The negative pressure generating section is located in the vicinity of a geometric center of the head slider, and yet, nearer to an air inflow side from the geometric center. This structure prevents the head slider from colliding against the medium. This is disclosed in the following non-patent document 1: "Slider and HGA designs for both smooth load/unload operation and high shock resistance" written by Ni. Sheng et al, in the prepared text for the 2002 IEEE international Magnetics Conference held in Netherland, RAI Congress Center, April 28–May 2, AD11.

However, the foregoing conventional flying head-slider has a shock-resistance G so low as approx. 80 (g), where 1 (g)=9.8 (m/s), that it is not practically effective. In the case of a portable information apparatus including a magnetic disc driving device, the device is recently required to have as much as several hundreds of G. There have been no specific study about a structure of a flying head-slider that could achieve such a high shock-resistance.

SUMMARY OF THE INVENTION

The present invention addresses the foregoing problems, and aims to provide a flying head-slider which can fly over a recording medium in a stable manner. The head-slider is free from colliding against the medium even if an inertia force having acceleration of as much as several hundreds of G is applied to the head slider, where the inertia force pulls the head slider away from the media.

The flying head-slider of the present invention comprises the following elements:

a first air bearing having plural step-faces and disposed on a base surface at an air-inflow side; and a second air bearing being disposed on the base surface at an air-outflow side, where the upper most surface of the second air bearing is lower than that of the first air bearing.

This structure allows generating a negative pressure in a space between the first and the second air bearings. Thus even if the inertia force removing the head slider from the medium is applied to the head slider, this structure allows the head slider to fly over the media in a stable manner. Further, the height of the upper most surface of the second air bearing is lower than that of the first air bearing, so that the first air bearing has fewer chances to touch the medium at bearing's air-inflow side. Still further, the plural step-faces provided to the first air bearing can achieve a structure easier to control both of a magnitude of a pressure generated in the first air bearing and a distribution of the pressure depending on a design of the step-faces.

The plural step-faces of the first air bearing can include the following three faces: starting from the air-inflow side, a first step face, a second step face higher than the first one, and the upper most surface higher than the second one. This structure allows manufacturing the flying head-slider of simpler structure and more excellent in productivity.

Side rails extending from both ends along the shorter side of the slider toward the air outflow side of the first air bearing can be formed. This structure allows generating the negative pressure more efficiently.

A negative pressure generating section provided between the first and the second air bearings, and a center of generating a negative pressure can be nearer to the air inflow side from the gravity center of the head slider. This structure allows the head slider to fly over the medium in a stable manner when the inertia force pulling the slider away from the media is applied to the slider.

Height difference LA between the upper most surface of the first air bearing and the base surface can be in the following relation with longitudinal length L of the slider:

$$3.2 \times 10^{-4} L \leq LA \leq 3.6 \times 10^{-4} L$$

This structure allows the head-slider to be highly shock-resistant against the inertia force pulling the slider away from the media.

Height difference L2 between the upper most surface of the first air bearing and the second step-face can be in the following relation with the foregoing height difference LA:

$$2.9 \times 10^{-2} LA \leq L2 \leq 3.3 \times 10^{-2} LA$$

This structure allows a head slider to read data from and write data to a downsized medium of higher density (approx. 30 GB/in$^2$).

Height difference L1 between the first step-face and the second step-face of the first air bearing can be in the following relation with the foregoing height difference LA:

$$13.4 \times 10^{-2} LA \leq L1 \leq 14.5 \times 10^{-2} LA$$

This structure allows a head slider to read data from and write data to a downsized medium of higher density (approx. 30 GB/in$^2$).

The second air bearing can include plural step-faces, thereby controlling with ease both of a magnitude of a pressure generated in the second air bearing and a distribution of the pressure depending on a design of the step-faces.

The plural step-faces of the second air bearing can include the following two faces: starting from the air inflow side, a step-face higher than the base surface and the upper most surface higher than the step-face. This structure allows manufacturing the flying head-slider of simpler structure and more excellent in productivity.

The first step-face of the first air bearing can be as high as the step face of the second air bearing. This structure achieves the flying head-slider of the most excellent both in productivity and shock resistance.

Next, a head supporting device of the present invention includes the flying head-slider discussed above and a suspension which applies a given energizing force to the slider from an opposite side of the base surface where the first and the second air bearings are disposed. This structure achieves a head supporting device to include the flying head-slider of the present invention and to be excellent in shock resistance.

The suspension can include a pivot which applies a given energizing force to the flying head-slider. This structure allows the supporting device to hold the flying head-slider rotatably both in a pitch and a roll directions. Thus a head supporting device, being excellent in shock resistance, particularly highly shock-resistant against the direction of moving away from the recording medium, is obtainable.

Finally, a disc driving device of the present invention comprising the following elements:
  the foregoing head supporting device;
  a disc-shaped recording medium;
  driving means for driving and spinning the recording medium;
  swinging means for swinging the suspension of the head supporting device in a radius direction of the medium; and
  control means for controlling the driving and spinning of the recording medium by the driving means, and the swing by the swinging means.

This structure achieves a disc driving device to be equipped with the flying head-slider of the present invention and excellent in shock resistance, particularly against the shock in a direction of moving away from the medium.

Assume that a pivot position is formed at a place where the pivot of the head supporting device touches the flying head-slider, and when the gravity center of the slider and the pivot position are projected onto the medium, the two projected places coincide with each other. This structure achieves the disc driving device to be the most excellent in the shock resistance.

BRIEF DESCRIPTIONS OF THE DRAWINGS

FIG. 7(a) illustrates action of the head slider in accordance with the first embodiment of the present invention.

FIG. 7(b) illustrates action of the head slider of the comparison sample used in the first embodiment of the present invention.

DETAILED DESCRIPTION OF PREFERRED EMBODIMENTS OF THE INVENTION

Exemplary embodiments of the present invention are demonstrated hereinafter with reference to the accompanying drawings.

EXEMPLARY EMBODIMENT 1

Figure 1A:
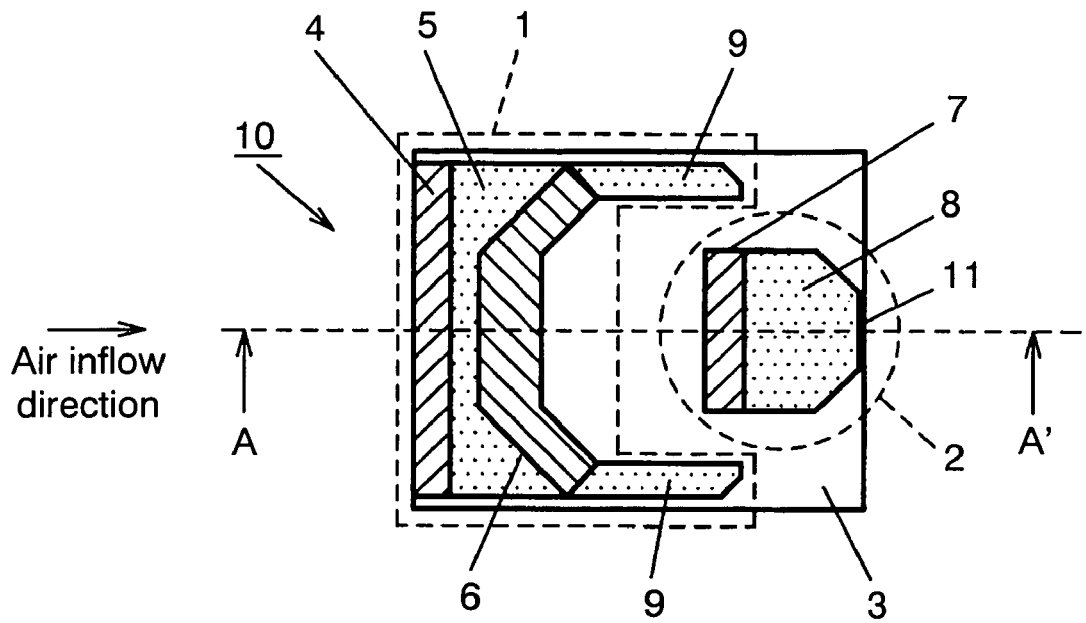
FIG. 1(a) is a plan view of an air bearing surface of a flying head-slider in accordance with a first exemplary embodiment of the present invention.
Figure 1B:
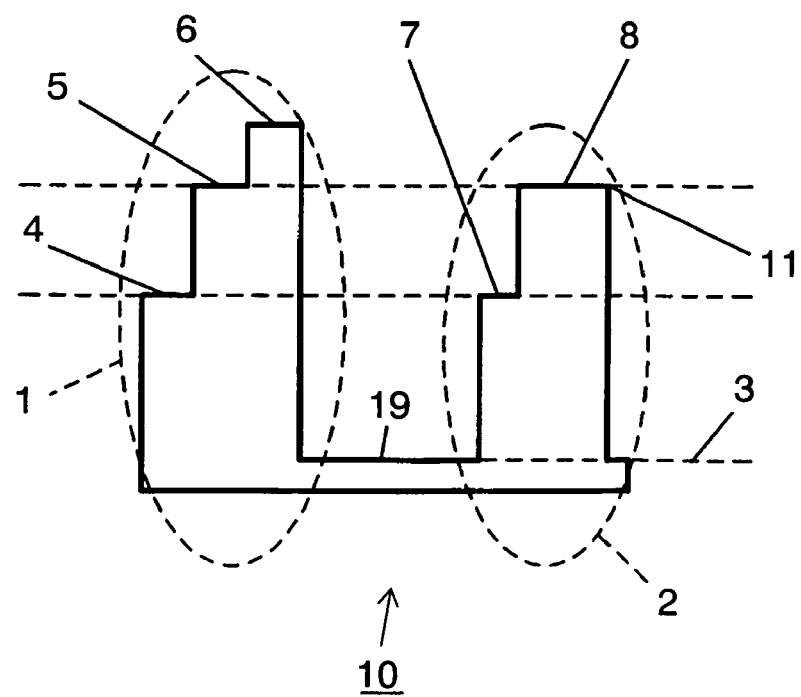
FIG. 1(b) is a sectional view illustrating a shape of the air bearing surface of the flying head-slider in accordance with the first exemplary embodiment of the present invention.

First, a structure of a flying head-slider of the present invention is described. FIG. 1 shows a shape of an air bearing surface of a flying head-slider (hereinafter simply referred to as a head slider) in accordance with the first exemplary embodiment of the present invention. FIG. 1(a) is a plan view thereof and FIG. 1(b) is a sectional view taken along line 1—1 of FIG. 1(a). Air flows in from the left on the paper both of FIGS. 1(a) and 1(b), and the left side and the right side of the paper are hereinafter referred to as an air inflow side and an air outflow side respectively.

Figure 2A:
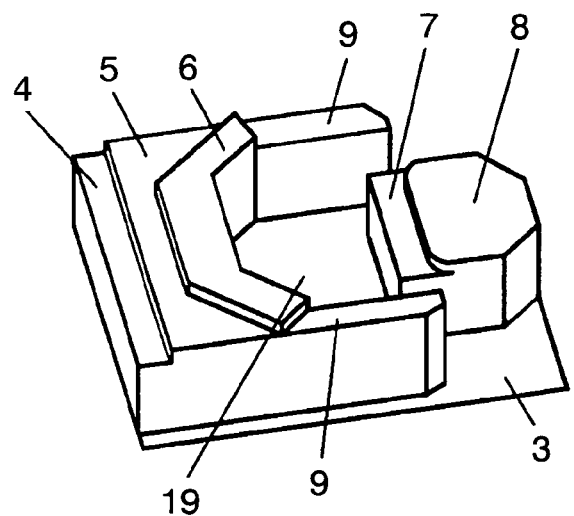
FIG. 2(a) is a perspective view of the head slider in accordance with the first exemplary embodiment of the present invention.
Figure 2B:
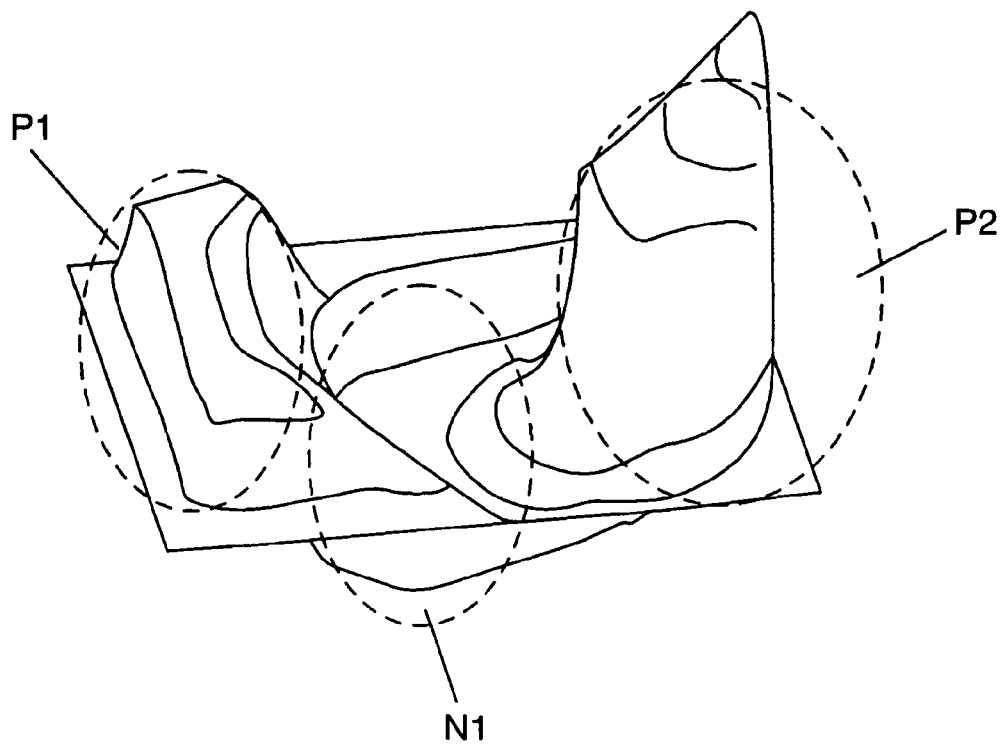
FIG. 2(b) shows a distribution of a pressure generated between the air bearing surface of the head slider in accordance with the first embodiment and a recording medium to be faced to the head slider.

FIG. 2(a) is a perspective view of the head slider in accordance with the first embodiment, and FIG. 2(b) shows a distribution of a pressure generated in a space between the air bearing surface and a recording medium facing to the air bearing surface. In FIG. 2(a), a lower section than a base surface is omitted in order to show the shape of the air bearing surface more explicitly.

In FIGS. 1 and 2, head slider 10 in accordance with this embodiment comprises first air bearing 1 and second air bearing 2, in this order from the air inflow side, both disposed on base surface 3. The air bearing refers to a section of the air bearing surface, and the section generates a positive pressure in the space between the head slider and the recording medium facing to the slider, as shown in the pressure distribution of FIG. 2(b). In FIG. 2(b), area P1 generating a positive pressure corresponds to first air bearing 1, and area P2 generating a positive pressure corresponds to second air bearing 2.

An area between first air bearing 1 and second air bearing 2 generates a negative pressure, and is referred to as negative-pressure generating section 19. In FIG. 2(b), negative pressure generating section 19 corresponds to area N1. As shown in FIGS. 1 and 2, head slider 10 includes two side-rails 9 along the longitudinal direction of slider 10. This structure allows generating a high negative pressure more efficiently in the space between the slider and the recording medium by controlling an air flow. Head slider 10 can steadily fly over the recording medium due to a balance between the positive pressure and the negative pressure.

First air bearing 1 of head slider 10 has upper most surface 6 higher than upper most surface 8 of second air bearing 2 as shown in FIG. 1(b). Dimensions of head slider 10 in FIG. 1 are expressed as follows: longer side length×shorter side length=1.235 mm×1.000 mm, namely this is a so called 30% slider or PICO slider, where the longer side length is along the air inflow direction, and the shorter side length is along the vertical direction with respect to the air inflow direction.

First air bearing 1 includes first step-face 4, second step-face 5 and upper most surface 6, in this order from the air inflow side, and second step-face 5 is higher than first step-face 4, and upper most surface 6 is higher than second step-face 5. Side rails 9 are formed at the same height as second step-face 5. Second air bearing 2 includes step-face 7 and upper most surface 8 in this order from the air inflow side.

Because of the convenience in manufacturing head sliders 10, first step-face 4 of first air bearing 1 is formed as high as step-face 7 of second air bearing 2. Second air-face 5 of first air bearing 1 is formed as high as upper most surface 8 of second air bearing 2. Second air bearing 2 includes magnetic head 11 at its air outflow side.

Figures 3A, 3B:
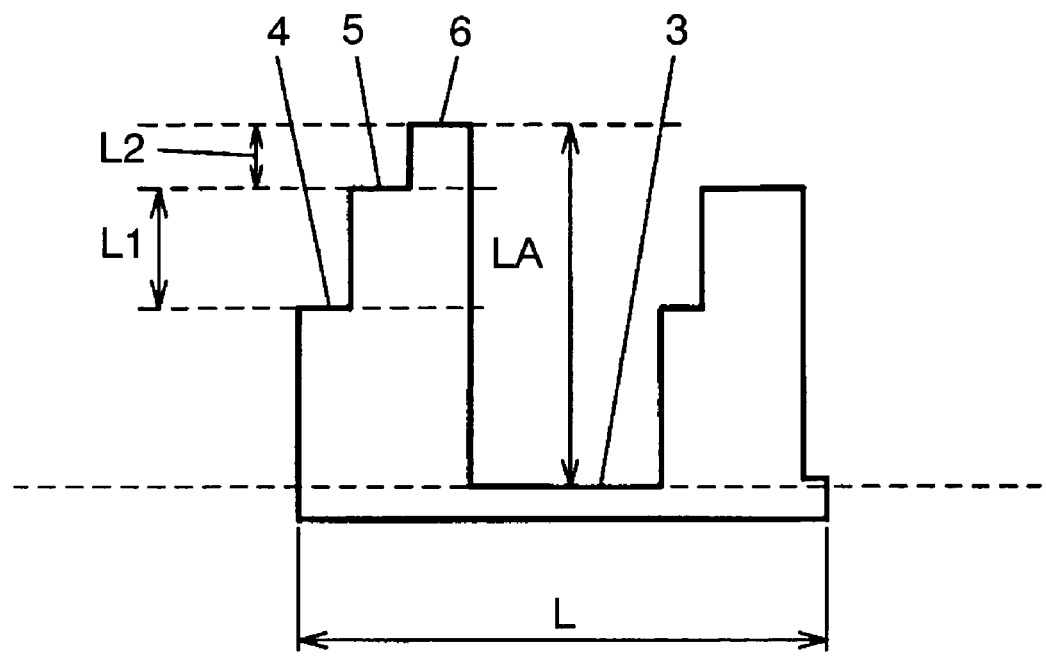
FIG. 3(a) shows definitions of reference marks used in the first exemplary embodiment of the present invention.
FIG. 3(b) shows specific numbers represented by reference marks both of the head slider in accordance with the first embodiment and a comparison sample.

The structure of head slider 10 is further detailed hereinafter. FIG. 3(a) shows definitions of reference marks used in this embodiment, and FIG. 3(b) shows comparison of the respective reference marks in specific numbers between the head slider in accordance with this embodiment and a comparison sample described later.

In this embodiment, as shown in FIG. 3(a), the distance between base surface 3 and uppermost surface 6 of first air bearing 1 is defined as LA, the distance between first step-face 4 of the first air bearing 1 and second step-face 5 is defined as L1, the distance between second step-face 5 and upper most surface 6 is defined as L2, and the length along the longer side of head slider 10 is defined as L. Then head slider 10 has the dimensions as shown in FIG. 3(b), namely LA=600 nm, L1=60 nm, and L2=15 nm.

Figure 4:
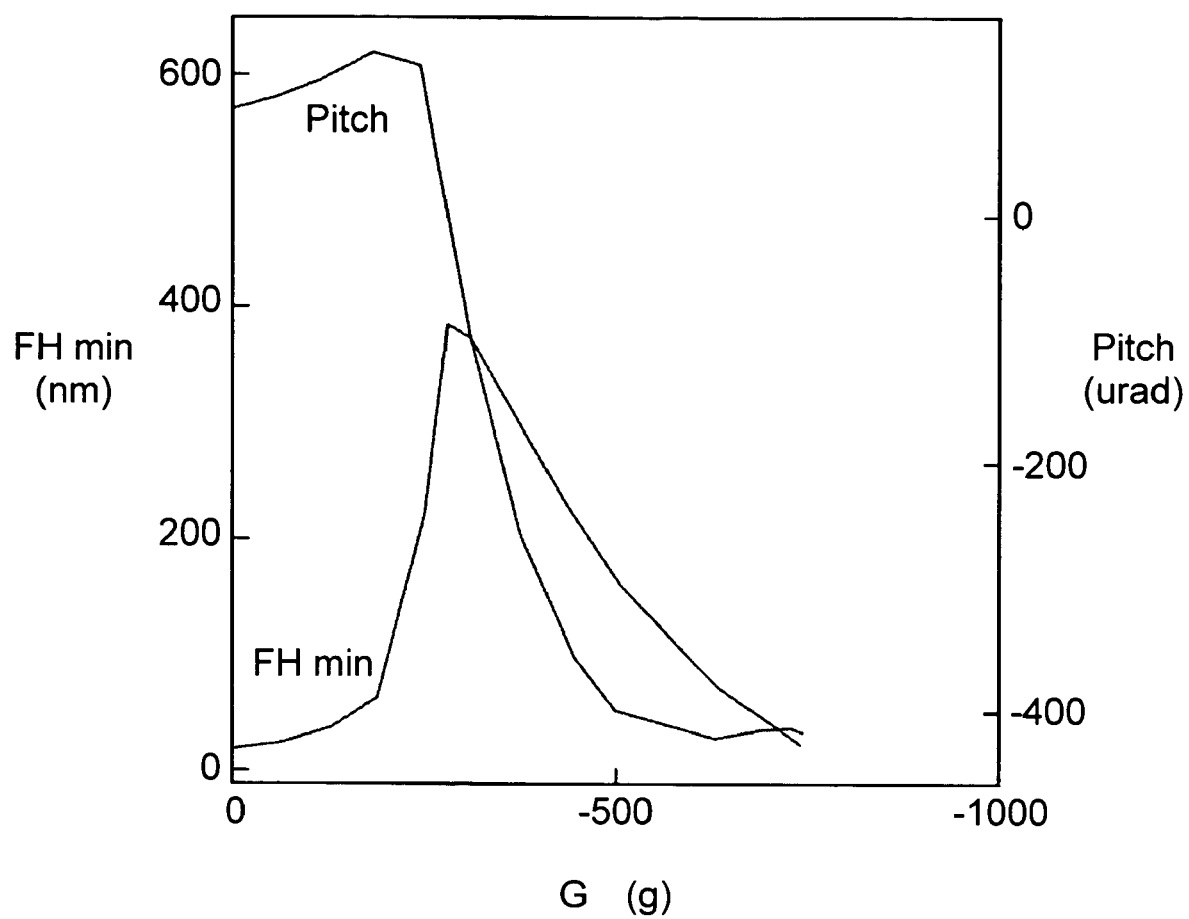
FIG. 4 illustrates a reaction of the head slider in accordance with the first embodiment when external inertia force F is applied to the head slider.

When an inertia force along the direction of removing head slider 10 from a recording medium is applied to head slider 10, the reaction taken by slider 10 is described hereinafter. FIG. 4 shows the reaction taken by head slider 10 to shock acceleration G when inertia force F removing slider 10 from the medium is applied to head slider 10. The reaction in this embodiment is calculated through simulation in the following condition: load=1 gf, radius=10 mm, rpm=3000 r/m, and skew angle=0 degree.

In FIG. 4, the horizontal axis represents shock acceleration G due to an inertia force removing head slider 10 from a recording medium, and the vertical axis represents a min. fly height and a pitch angle. The min. fly height FH is a clearance between the closest section of slider 10 to the recording medium and the medium. The pitch angle is an angle formed by slider 10 with respect to the recording medium, where an elevation angle formed by slider 10 with respect to the air inflow direction takes only a positive value. Since acceleration G is along the direction of removing the head slider from the recording medium, acceleration G in FIGS. 4 and 6 takes a negative value.

As shown in FIG. 4, in a steady state (no inertia force F is applied, i.e., G=0), minimum clearance FH min.=approx. 20 nm, and pitch angle=approx. 100 μrad. The greater an absolute value of shock acceleration G due to the application of inertia force F along the direction of removing the head slider from a recording medium entails the greater pitch angle. However, the pitch angle reaches the max. degree at an absolute value of G=approx. 200 (g), then it decreases after an absolute value of G exceeds 200 (g). In the area of an absolute value of G≧300 (g), the pitch angle takes a negative value, where 1 (g)=9.8 (m/s$^2$).

When the pitch angle takes a negative value due to further increase of an absolute value of shock acceleration G, the minimum clearance FH min. still takes a positive value before an absolute value of G reaches approx. 720 (g). In other words, head slider 10 keeps flying in a stable manner before an absolute value of G reaches as much as approx. 720 (g).

As discussed above, head slider 10 in accordance with this embodiment keeps flying in a stable manner even if an inertia force, removing head slider 10 from a recording medium, is applied to slider 10 and generates shock acceleration as much as G=720 (g). In other words, the head slider proves not to collide against the recording medium.

A study proves that the presence of second step face 5 prepared in first air bearing 1 greatly influences the reaction of head slider 10 when inertia force F along the direction of moving away from a recording medium is applied to head slider 10. The reason is detailed hereinafter.

Figure 5A:
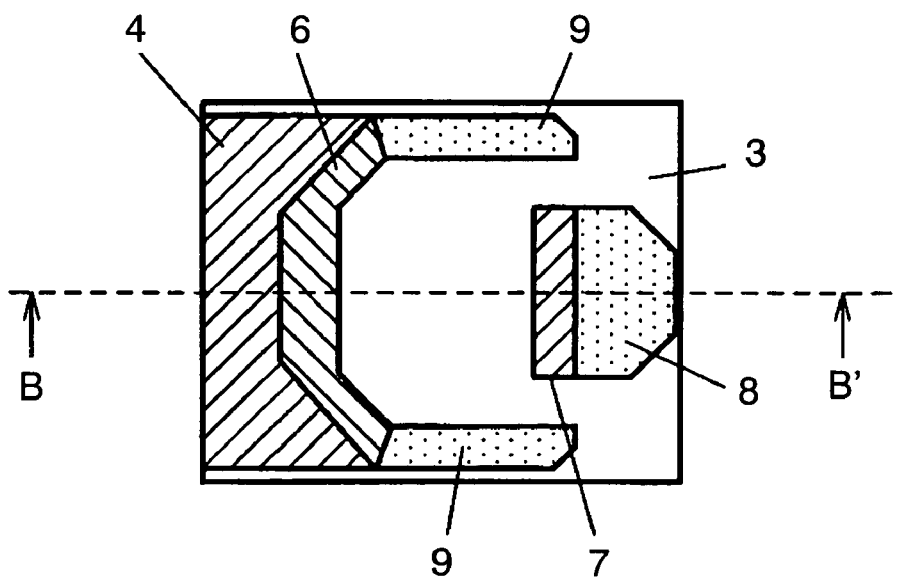
FIG. 5(a) is a plan view of a comparison sample used in the first embodiment of the present invention.
Figure 5B:
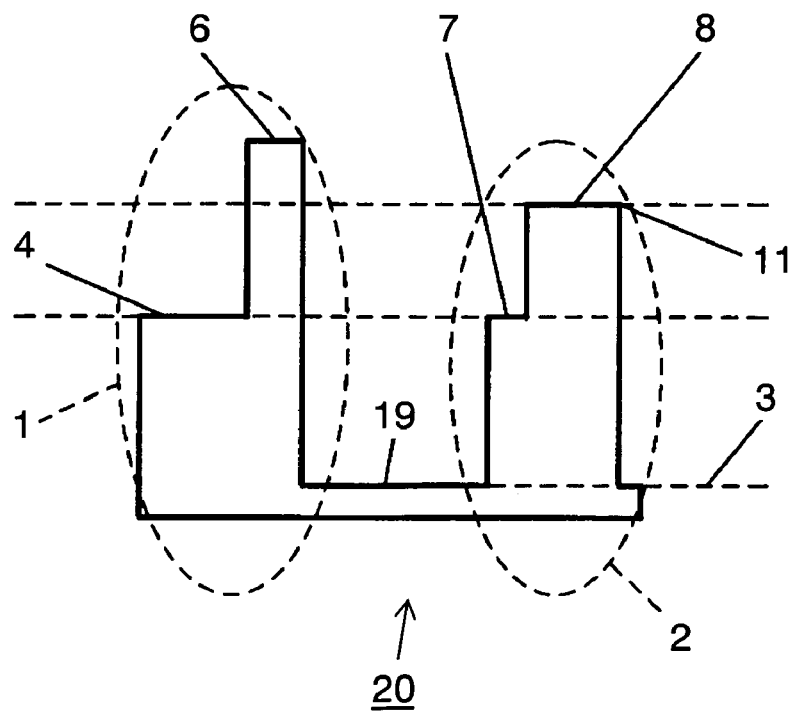
FIG. 5(b) is a sectional view of the comparison sample used in the first embodiment of the present invention.

FIG. 5 shows an example for comparison, i.e., a structure of another head slider 20 which does not have this second step-face 5. FIG. 5(a) is a plan view of head slider 20, and FIG. 5(b) is a sectional view taken along line B–B' of FIG. 5(a). Head slider 20 differs from head slider 10 of this embodiment only in the lack of second step-face 5, and stays unchanged in the other points, so that similar elements have the same reference marks as slider 10 and the descriptions thereof are omitted here.

Relations between respective step-faces are shown in FIG. 3(b), and the distance from upper most surface 6 to first step-face 4 is 75 nm. Other dimensions stay in the same numbers as those of head slider 10.

Figure 6:
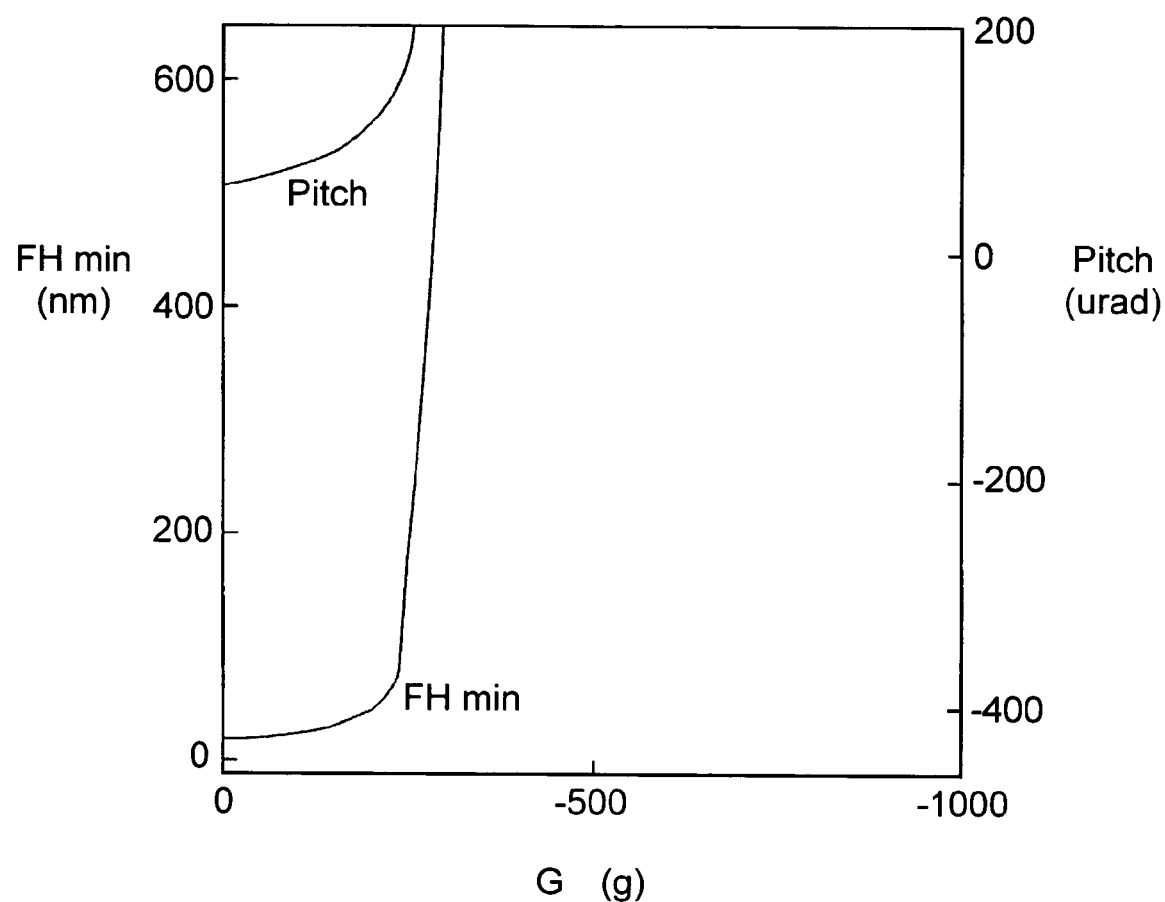
FIG. 6 illustrates a reaction of a head slider of the comparison sample used in the first embodiment when inertia force F is applied to the slider.

FIG. 6 illustrates the reaction taken by head slider 20 when inertia force F along the direction of moving away from a recording medium is applied to this comparison sample of head slider 20. As shown in FIG. 6, head slider 20 stays flying over the medium with min. FH=approx. 20 nm and pitch angle=approx. 80 μrad when inertia force F is not applied. When inertia force F is applied, both of the min. FH and the pitch angle increase; however, when head slider 20 receives shock acceleration over approx. 250 (g), it cannot keep flying because the air bearing film is not formed between slider 20 and the recording medium. Thus FIG. 6 does not show the result of pitch angle or min. FH. In other words, inertia force F generating shock acceleration G over 250 (g) would remove head slider 20 far away from the medium. In general, head slider 20 is retained by a suspension having spring-elasticity. Moving away of head slider 20 from the recording medium causes the spring elasticity of the suspension (restoring force from a bent condition to an original condition) to apply an action force to head slider 20 toward the recording medium. Head slider 20 possibly collides at last against the medium and possibly damages magnetically or mechanically the medium. Head slider 20 receives a greater elastic force at a larger distance between slider 20 and the medium, thereby increasing the possibility of the collision.

This phenomenon is further detailed using FIG. 7, which illustrates the reactions taken by head slider 10 of this embodiment and the comparison sample of head slider 20 to inertia force F along the direction of moving away from a recording medium. FIG. 7(a) shows the reaction taken by head slider 10, and FIG. 7(b) shows the reaction taken by head slider 20.

As shown in FIG. 7(a), in head slider 10, center point NP of generating a negative pressure is located nearer to the air inflow side from gravity center GP, where NP is calculated from the pressure distribution chart shown in FIG. 2(b). Therefore, when upward inertia force F is applied to head slider 10, anti-clockwise moment occurs in head slider 10 as shown in the right drawing of FIG. 7(a), so that the pitch angle becomes negative (depression angle), however, the air bearing film still remains due to the balance with the airflow.

On the other hand, in the comparison sample of head slider 20, since no second step-face 5 is formed, airflow is difficult to enter between slider 20 and the recording medium. Therefore, a positive pressure of first air bearing 1 becomes smaller than that of head slider 10. In order to keep balance, center point NP of generating a negative pressure moves nearer to the air outflow side than that of head slider 10, where NP of slider 20 is a center point of negative pressure generating section 19 prepared between first air bearing 1 and second air bearing 2. Thus NP of head slider 20 is located nearer to the air outflow side from gravity center GP.

An application of inertia force F along the direction of moving away from the recording medium to slider 20 generates clockwise moment in slider 20 as shown in FIG. 7(b), so that the pitch angle increases too abrupt to retain the air bearing film between slider 20 and the medium. The airflow affects also this phenomenon. As a result, head slider 20 stays far away from the medium, then it probably collides against the medium and damages the medium magnetically or mechanically.

As discussed above, a shape of an air bearing surface of a head slider is designed such that the center point NP of generating a negative pressure is located nearer to the air inflow side from gravity center GP, thereby obtaining a head slider which can stay flying over the recording medium even if the head slider receives inertia force F along the direction of moving away from the medium.

In the case of the head slider in accordance with this embodiment, when the slider receives inertia force F along the direction of moving away from the recording media, the slider flies with the pitch angle kept negative. It seems that there is rather high probability of collision between the recording media and first air bearing 1 at the air inflow side. However, since the height of second bearing 2 is designed to be lower than the height of first air bearing 1, a positive pressure generated at second air bearing 2 becomes low, thereby obtaining a greater pitch angle in the steady flying status than that in a structure where the height of second air bearing 2 is the same as that of first air bearing 1. This mechanism allows increasing the anti-clockwise moment shown in FIG. 7(a), which is necessary for bringing first air bearing 1 into contact with the recording medium at the air inflow side of bearing 1. As a result, the possibility of touching between the head slider and the recording medium can be lowered.

The height of upper most surface 8 of second air bearing 2 is preferably the same as that of first step-face 4 or second step-face 5 of first air bearing 1 because of reducing the manufacturing cost.

Figure 8:
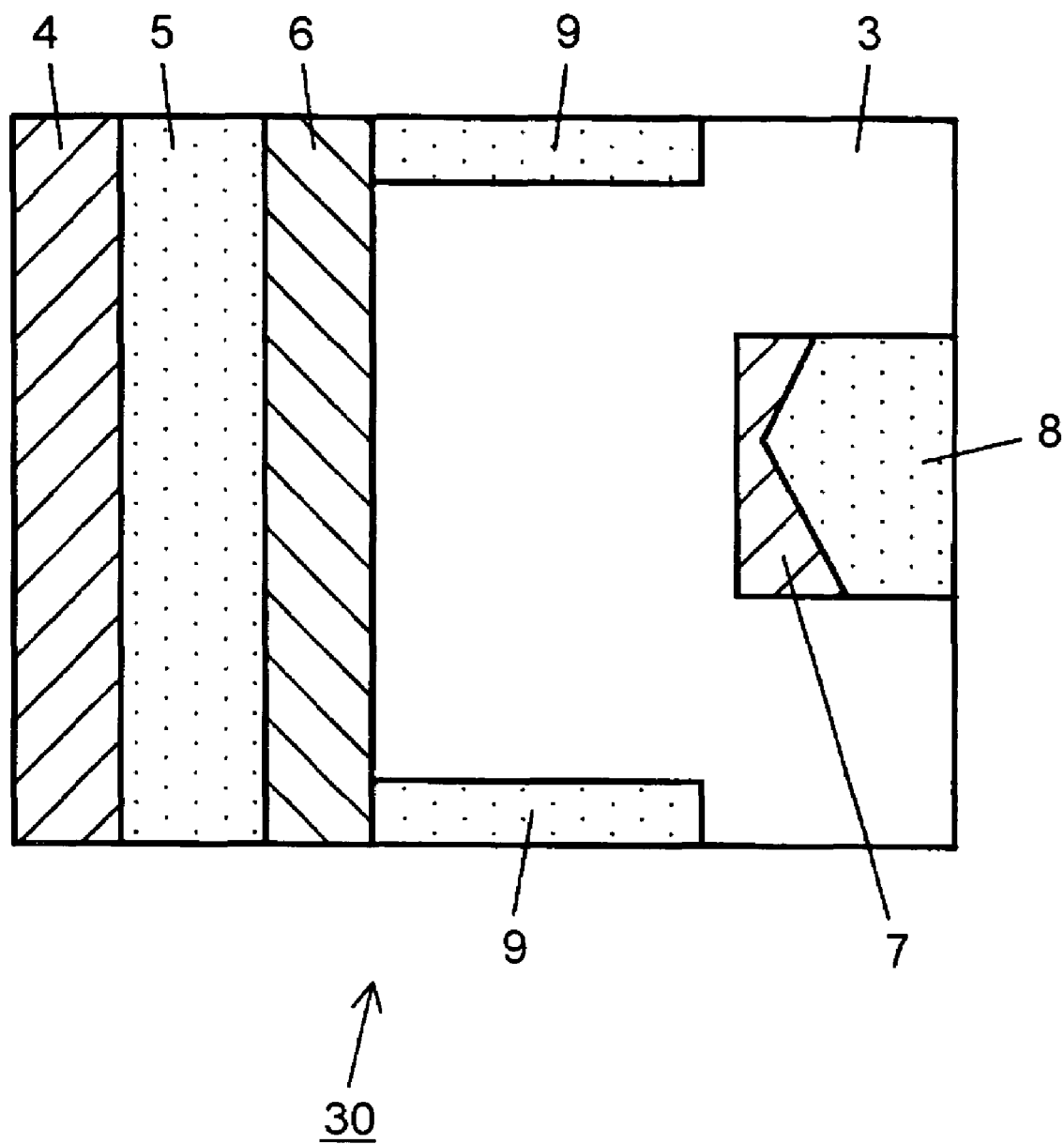
FIG. 8 shows a structure of another head slider in accordance with the first exemplary embodiment of the present invention.

In head slider 10 in accordance with this embodiment, as shown in FIGS. 1 and 2, upper most surface 6 of first air bearing 1 bends toward the air outflow side; however the present invention is not limited only to the shape of surface 6. For instance, head slider 30 shown in FIG. 8 is in a rectangular shape, and not to mention, the present invention includes this case.

This embodiment shows the case where first air bearing 1 of head slider 10 includes two step-faces, namely, first step-face 4 and second step-face 5; however, the present invention is not limited only to this case. For instance, if first air bearing 1 includes three step-faces, a similar advantage can be obtained without question; however, the structure having two step-faces is preferable from the practical view of point because of simpler manufacturing steps and a lower manufacturing cost.

This embodiment shows the case where second air bearing 2 includes step-face 7; however, the present invention is not limited to this case, but the structure without step-face 7 can be also useful.

Next, a structure having the highest shock resistance is studied in head slider 10 shown in FIGS. 1 and 2. The condition shown in FIG. 3(a) is used for this study. The study proves that distance LA between upper most surface 6 of first air bearing 1 and base surface 3 greatly influences controlling the shock resistance of head slider 10. Because, a magnitude of a negative pressure generated by negative-pressure generating section 19 prepared between first air bearing 1 and second air bearing 2 is controlled by changing distance LA.

Figure 9:
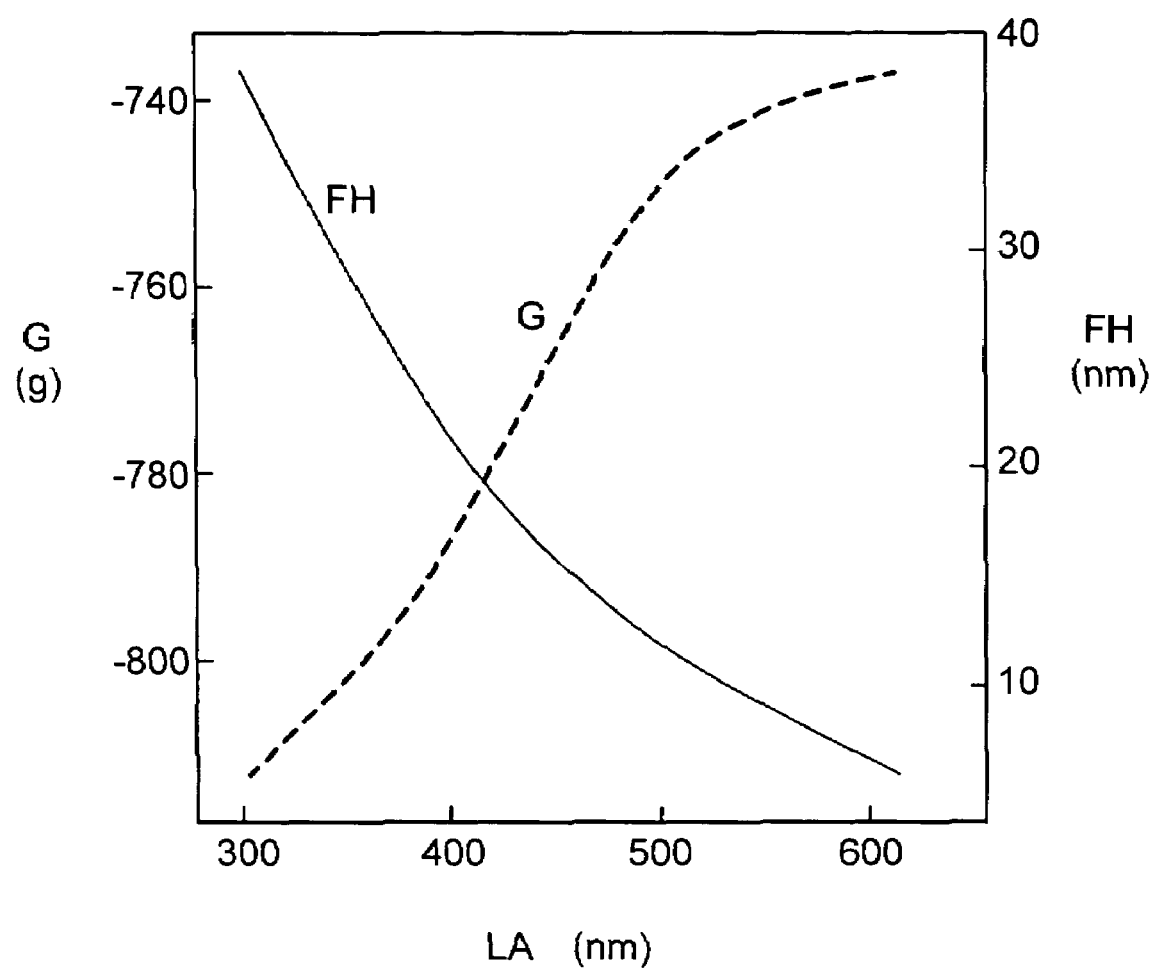
FIG. 9 illustrates relations between distance LA, shock acceleration G and fly height FH in accordance with the first exemplary embodiment.

FIG. 9 shows relations between distance (depth) LA, shock-resistant acceleration G, and fly height FH. Acceleration G takes a max. shock-resistant acceleration with which the air bearing film is allowed to form between the head slider and the recording medium. The two dimensions are fixed such as L1=60 nm, and L2=15 nm before calculations. Since acceleration G is along the direction of removing the head slider from the recording medium, acceleration G takes a negative value.

FIG. 9 shows that an absolute value of shock-resistant acceleration G decreases at greater distance LA, and the absolute value thereof increases at smaller distance LA. However, a change of distance LA will change fly height FH, which is a clearance between a magnetic head mounted to the head slider and the recording medium. In this context, fly height FH shows a value in a steady status where no inertia force F along the direction of moving away from the recording media is applied. Fly height FH decreases at a greater distance LA, and increases at a smaller distance LA.

Therefore, distance LA between upper most surface 6 and base surface 3 of head slider 10 can be determined in response to a required shock resistance and a specification of recording density by using the relations shown in FIG. 9. For instance, under the condition of a required fly height FH=20 nm (recording density: 30 GB/in$^2$) and allowable error=±5%, an optimum distance LA falls within 400 nm≦LA≦430 nm. At this time, an absolute value of shock-resistant acceleration G falls within 778 (g)≦G≦788 (g). As a result, a head slider which can withstand the shock acceleration of approx. 780 (g) is obtainable. Meanwhile, fly height FH=20 nm makes LA=420 nm and an absolute value of G=782 (g).

Figure 10:
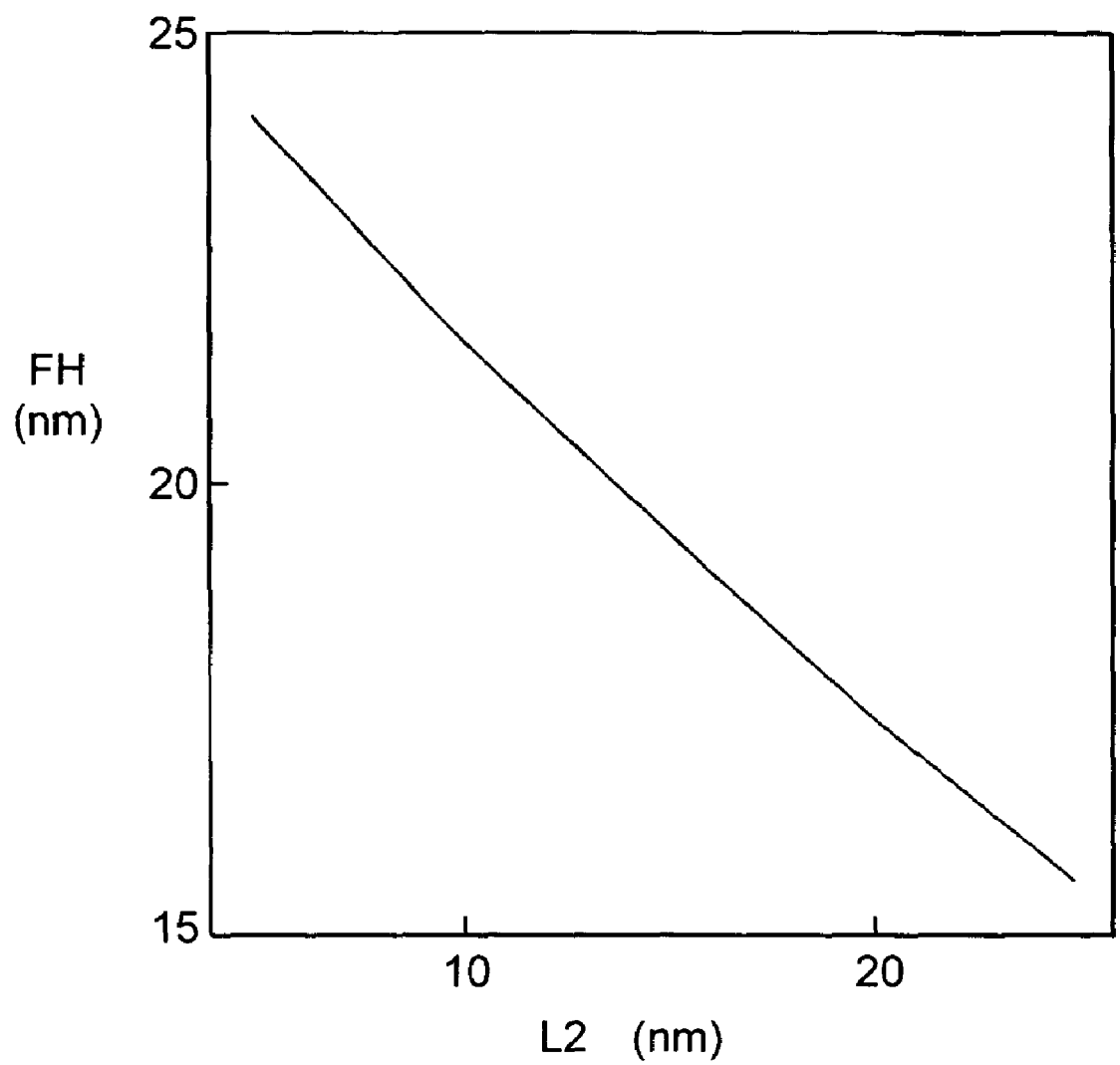
FIG. 10 shows a relation between distance L2 and fly height FH in accordance with the first exemplary embodiment of the present invention.

Next, optimum distance L2 with distance LA fixed at 420 nm is studied. FIG. 10 shows a relation between distance L2 and fly height FH. The study proves that those two factors correlate with each other, and fly height FH increases at a smaller distance L2, and fly height FH decreases at a greater distance L2. Although this is not shown in the drawings, distance L2 does not correlate with shock-resistant acceleration G.

Distance L2 can be thus determined in response to a required fly height FH by using the relation shown in FIG. 10. For instance, assume that a required FH=20 nm±5%, then L2 falls within 13.0 nm≦L2≦13.4 nm according to FIG. 10. Meanwhile, FH=20 nm makes L2=13.2 nm.

Figure 11:
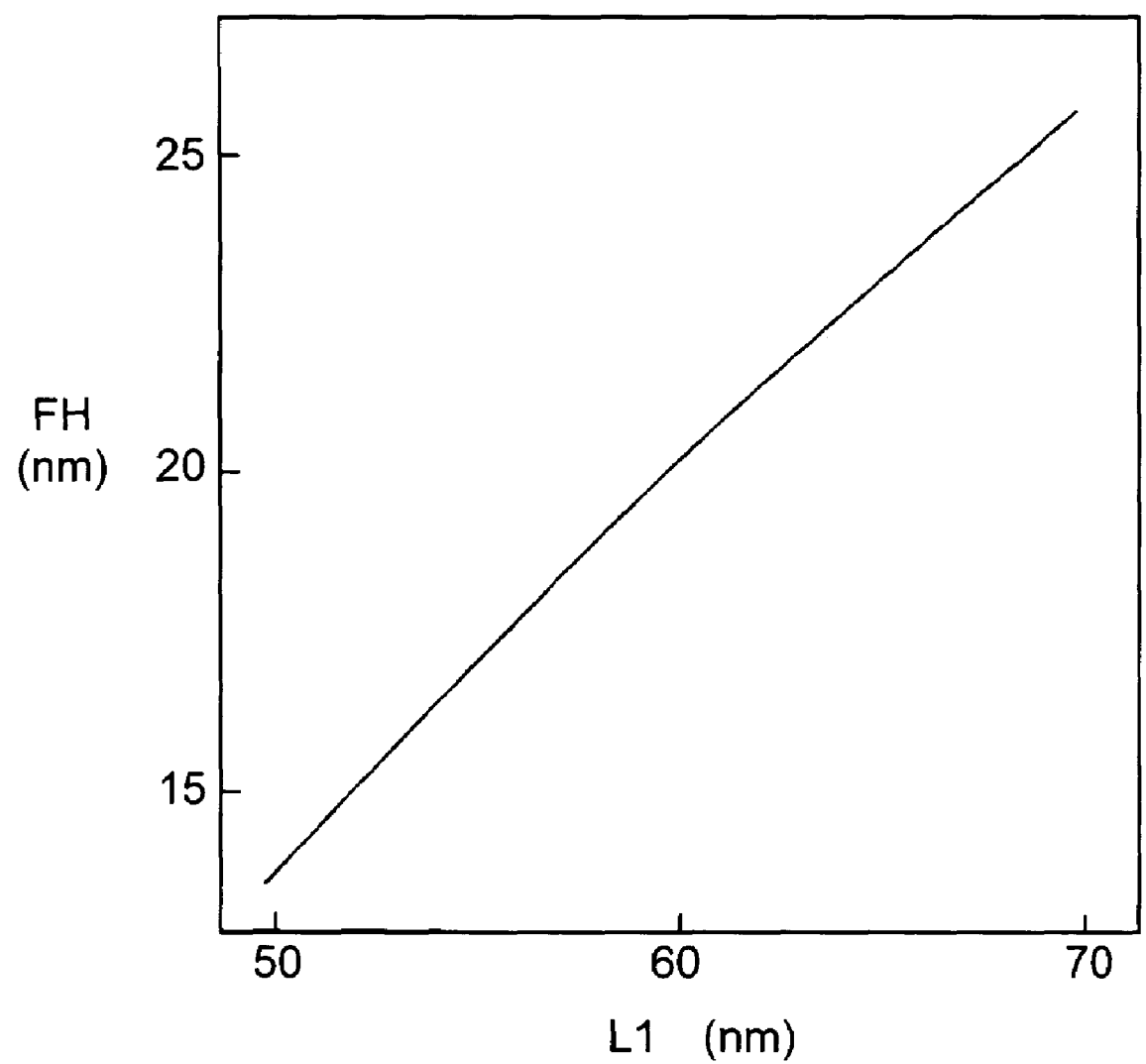
FIG. 11 shows a relation between distance L1 and fly height FH in accordance with the first exemplary embodiment of the present invention.

Next, an optimum distance L1 with LA fixed at 420 nm and L2 fixed at 13.2 nm is studied. FIG. 11 shows a relation between distance L1 and fly height FH. The study proves that distance L1 correlates with fly height FH, and fly height FH decreases at a smaller distance L, and fly height FH increases at a greater distance L1. Although this is not shown in the drawings, distance L1 does not correlate with shock-resistant acceleration G.

Distance L1 can be thus determined in response to a required fly height FH by using the relation shown in FIG. 11. For instance, assume that a required FH=20 nm±5%, then L1 falls within 58.0 nm≦L1≦61.0 nm according to FIG. 11. Meanwhile, FH=20 nm makes L1=59.9 nm.

The studies discussed above prove that the following dimensions should be designed in order to achieve the highest shock resistance and fly height FH=20 nm: LA=420 nm, L1=59.9 nm and L2=13.2 nm. As a result, a desirable head slider is obtainable.

In the case of required fly height=20 nm±5% (recording density: 30 GB/in$^2$), if the air bearing surface of the head slider can be designed such that the dimensions fall within the following ranges, the head slider that can achieve the highest shock resistance and fly height=20 nm is obtainable:

$$58.0 \text{ nm} \leq L1 \leq 61.0 \text{ nm}$$

$$13.0 \text{ nm} \leq L2 \leq 13.4 \text{ nm}$$

$$400 \text{ nm} \leq LA \leq 430 \text{ nm}.$$

In the foregoing case, use of length L=1.235 mm of the longer side of head slider 10 can normalize distances L1, L2 and LA as follows:

$$3.2 \times 10^{-4} L \leq LA \leq 3.6 \times 10^{-4} L$$

$$2.9 \times 10^{-2} LA \leq L2 \leq 3.3 \times 10^{-2} LA$$

$$13.4 \times 10^{-2} LA \leq L1 \leq 14.5 \times 10^{-2} LA$$

The head slider, of which dimensions fall within the ranges discussed above, is excellent in shock resistance. Shock-resistant acceleration G, indicating the shock resistance of this structure, is in the range of 778 (g)<G<788 (g).

This embodiment refers to the head slider employed in a magnetic disc driving device; however, the head slider of the present invention is not limited to the magnetic disc driving device, but applicable to magneto-optical disc driving devices and optical disc driving devices.

This embodiment refers to the case based on the simulation under the condition of rpm=3000 r/m and the like; however, this condition does not limit the present invention, but the head slider of the present invention is not limited by the operating conditions such as an rpm, a load, and a size of the head slider. For instance, in the practical range of the rpm used in magnetic disc driving devices, the case discussed in this embodiment performs excellent shock resistance without question, and the flying head-slider of the present invention can also performs excellent shock resistance discussed above at rather a lower rpm ranging from 2000–5000 r/m which is generally used in a mini magnetic-disc driving devices.

In this embodiment, the so called 30% head slider or PICO head slider is used for the description, where the dimensions of this head slider are this: longer side length (along the air inflow direction)×shorter side length (along the vertical direction with respect to the air inflow direction)=1.235 mm×1.00 mm. However, the dimensions do not limit the head slider of the present invention. For instance, use of a so called 20% slider or a FEMTO slider, of which dimensions are 0.85 mm×0.7 mm, can produce a similar advantage.

The head slider of the present invention is not limited to an amount of load applied to the head slider in operation. For instance, the foregoing PICO slider or FEMTO slider can work with the load ranging from 0.5 g to 2.5 g.

EXEMPLARY EMBODIMENT 2

Figure 12:
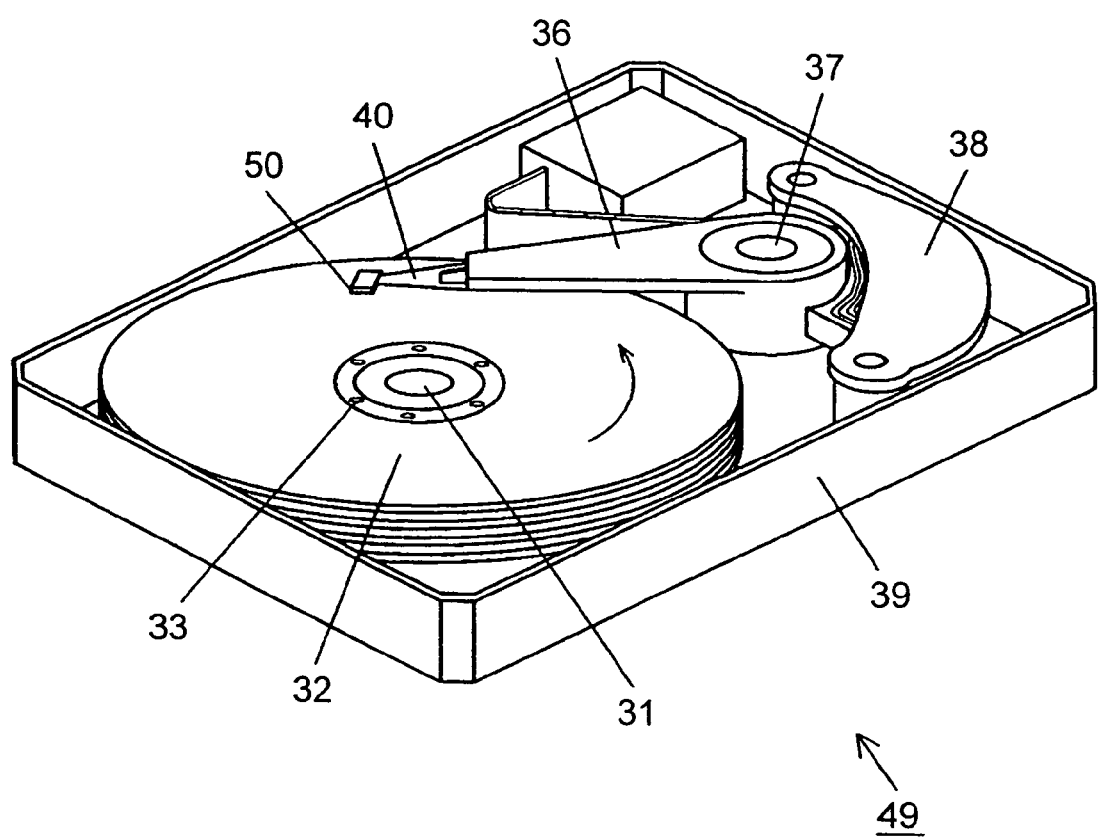
FIG. 12 is a perspective view of an essential part of a disc driving device employing a head slider and a head supporting device in accordance with a second exemplary embodiment of the present invention.
Figure 13:
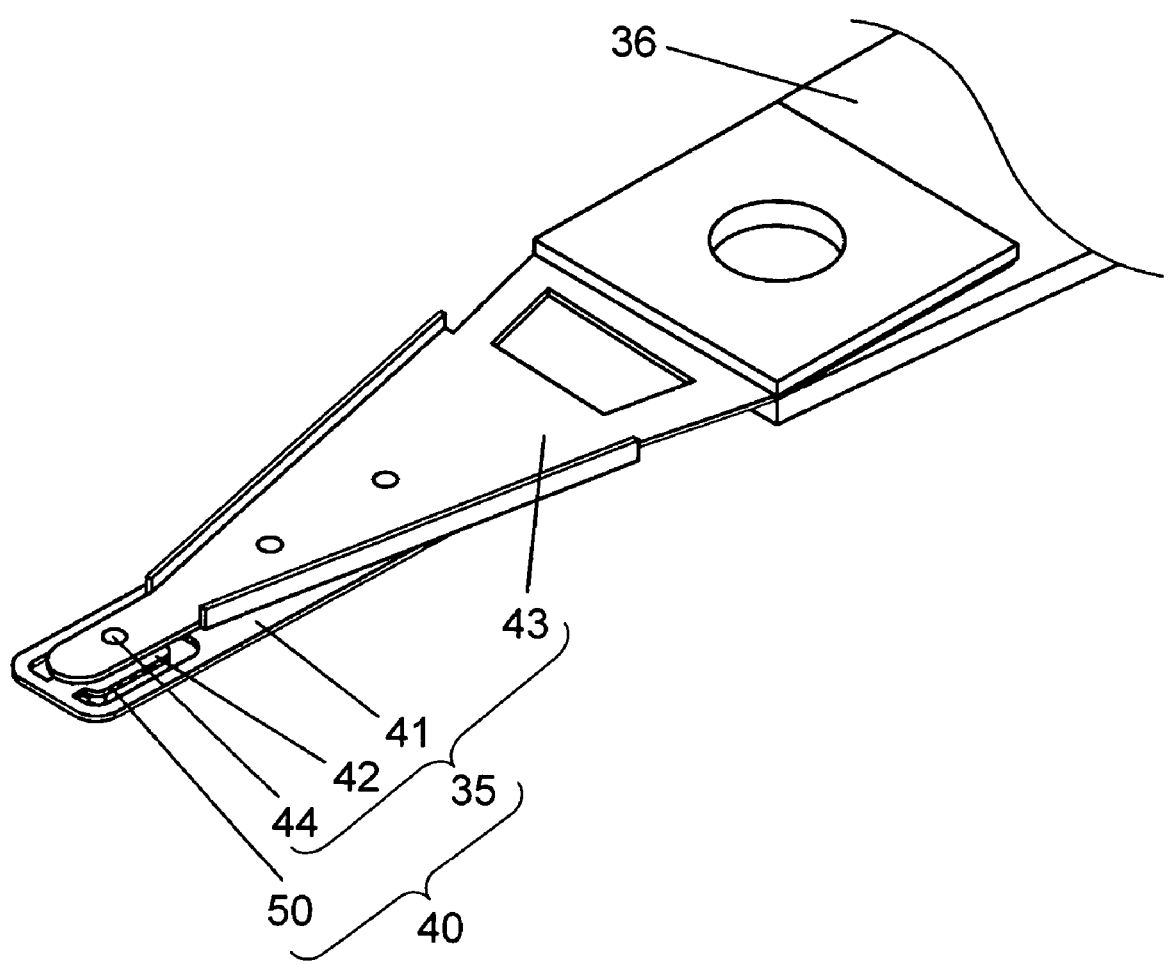
FIG. 13 is a perspective view of an essential part of a disc supporting device employing a head slider in accordance with the second exemplary embodiment of the present invention.

A head supporting device and a disc driving device, both of which use the head slider of the present invention, are described with reference to accompanying drawings. FIG. 12 is a perspective view of an essential part of the disc driving device in accordance with the second exemplary embodiment of the present invention. A magnetic disc driving device is taken as an example of the disc driving device. FIG. 13 is a perspective view of an essential part of the head supporting device in accordance with the second exemplary embodiment of the present invention.

In FIG. 12, disc 32 is rotatably supported by main shaft 31, and driven and spun by driving means 33, which uses, e.g., a spindle motor. Head supporting device comprises the following elements:

head slider 50 of the present invention equipped with a head (not shown) for reading data from and writing data to a recording medium; and suspension 35 to which this head slider 50 is fixed. Head supporting device 40 is fixed to actuator arm 36, which is rotatably mounted to actuator shaft 37.

Head slider 50 in accordance with the second exemplary embodiment of the present invention comprises a first air bearing prepared on a base surface at an air inflow side, and a second air-bearing having a head and being prepared on the base surface at an air outflow side, as described in the first embodiment. Head slider 50 includes plural step-faces at the first air bearing, and the height of the upper most surface of the second air bearing is lower than the upper most surface of the first air bearing.

Further, head slider 50 preferably has the following dimensions when distances L1, L2 and LA listed in FIG. 3(a) are normalized by length L of the longer side:

$$3.2\times10^{-4}L \leq LA \leq 3.6\times10^{-4}L$$

$$2.9\times10^{-2}LA \leq L2 \leq 3.3\times10^{-2}LA, \text{ and}$$

$$13.4\times10^{-2}LA \leq L1 \leq 14.5\times10^{-2}LA.$$

The definitions of respective factors are the same as those used in the first embodiment, thus the descriptions thereof are omitted here.

Swinging means 38 can use, e.g., a voice-coil motor, and swing actuator arm 36 to move head slider 50 over disc 32 for positioning the head over any desirable track. Housing 39 encloses those elements therein for retaining them at given locations.

FIG. 13 is a perspective view of an essential part of head supporting device 40 which includes suspension 35 and head slider 50. Head slider 50 is fixed at ligula 42 prepared at a first end of slider-holder 41. A second end of holder 41 is fixed at beam 43.

Slider-holder 41 uses, e.g., a gimbal spring, and allows head slider 50 to pitch and roll. Head slider 50 is fixed to holder 41 with, e.g., adhesive, and holder 41 is fixed to beam 43 by, e.g., welding. Pivot 44 is prepared at a tip of beam 43 for applying a load to head slider 50. A given load is applied to head slider 50 via pivot 44. A pivot place, where pivot 44 contacts head slider 50, is a load acting place as discussed in the first embodiment, namely, the place where an inertia force acts on head slider 50 when the inertia force of a shock due to external disturbance is applied.

In this case, head supporting device 40 is preferably structure such that when the gravity center of slider 50 and the pivot place are projected onto the disc surface, the two projected places coincide with each other. This structure allows head supporting device 40 to be the most excellent in shock resistance.

Head supporting device 40 comprises the following elements: suspension 35 including (a) beam 43 equipped with pivot 44 and (b) slider holder 41 equipped with ligula 42; and head slider 50.

In the case of reading data from and writing data to a spinning disc 32 (disc-shaped recording medium) with head supporting device 40 having the structure discussed above, head slider 50 receives the following three forces: (a) a load applied from pivot 44; (b) a positive pressure due to airflow for floating head slider 50 off from disc 32; and (c) a negative pressure for bringing head slider 50 toward disc 32. Head slider 50 flies over disc 32 at a stead fly height by the balance of those three forces. The controller swings swinging means 38 with this fly height kept at a constant value, so that head slider 50 is positioned over a target track. This mechanism allows a head (not shown) mounted on slider 50 to read data from and read data to disc 32.

Use of head-supporting device 40 equipped with head slider 50 of the present invention and disc driving device 49 equipped with the same device 40 achieves excellent shock resistance in both the head supporting device and the head driving device.

The present invention is not limited only to the magnetic disc driving device, but applicable to a variety of disc driving devices, employing a flying head-slider, such as magneto-optic disc driving devices and optical disc driving devices without question.

The present invention is not limited to the disc driving device using a disc-shaped recording medium, but applicable to recording/reproducing devices which use any shapes of recording media.

As discussed previously, use of the head slider of the present invention achieves a steady fly height over a recording medium free from collision of the head slider against the recording medium even in the following condition: An inertia force along the direction moving away from the recording medium is applied to the head slider, and the inertia force has an acceleration as much as approx. 700 (g).

Use of the head slider of the present invention in a head supporting device and a disc driving device can produce reliable head supporting devices and reliable disc driving devices. Those devices can prevent the head slider from colliding against the disc surface even if an inertia force due to an external large shock acts on the head slider.

What is claimed is:

1. A flying head slider comprising:
a first air bearing having a plurality of step-faces and being disposed on a base surface at an air inflow side; and
a second air bearing being disposed on the base surface at an air outflow side,
wherein an upper most surface of said second air bearing is lower than an upper most surface of said first air bearing, and
wherein the plurality of step-faces includes:
a first step-face;
a second step-face higher than the first step-face; and
the upper most surface of the first air bearing higher than the second step-face, in this order from the air inflow side.

2. The flying head slider of claim 1, wherein a height difference LA between the upper most surface of the first air bearing and the base surface falls within $3.2\times10^{-4}L \leq LA \leq 3.6\times10^{-4}L$, where L is a length of a longer side of the flying head slider.

3. The flying head slider of claim 2, wherein a height difference L2 between the upper most surface of the first air bearing and the second step-face of the first air bearing falls within $2.9\times10^{-2}LA \leq L2 \leq 3.3\times10^{-2}LA$.

4. The flying head slider of claim 2, wherein a height difference L1 between the first step-face of the first air bearing and the second step-face of the first air bearing falls within $13.4\times10^{-2}LA \leq L1 \leq 14.5\times10^{-2}LA$.

5. The flying head slider of claim 3, wherein a height difference L1 between the first step-face of the first air bearing and the second step-face of the first air bearing falls within $13.4\times10^{-2}LA \leq L1 \leq 14.5\times10^{-2}LA$.

6. The flying head slider of claim 1, wherein said second air bearing includes a plurality of step-faces.

7. The flying head slider of claim 6, wherein the plurality of step-faces of said second air bearing includes a further step-face formed higher than the base surface and the upper most surface of the second air bearing formed higher than the further step-face in this order from the air inflow side.

8. The flying head slider of claim 7, wherein the first step-face of said first air bearing is as high as the further step-face of said second air bearing.

9. A head supporting device comprising:
a flying head slider comprising a first air bearing having a plurality of step-faces and being disposed on a base surface at an air inflow side and a second air bearing having a head and being disposed on the base surface at an air outflow side; and
a suspension for applying a given energizing force to the flying head slider from a side opposite to a side on which the first air bearing and the second air bearing are disposed on the base surface, wherein an upper most surface of said second air bearing is lower than an upper most surface of said first air bearing, and wherein the plurality of step-faces includes:

a first step-face;

a second step-face higher than the first step-face; and the upper most surface of the first air bearing higher than the second step-face, in this order from the air inflow side.

10. The head supporting device of claim 9, wherein the suspension includes a pivot that applies the given energizing force to the flying head slider.

11. A disc driving device comprising:

a flying head slider comprising a first air bearing having a plurality of step-faces and being disposed on a base surface at an air inflow side and a second air bearing having a head and being disposed on the base surface at an air outflow side;

a suspension for applying a given energizing force to the flying head slider from a side opposite to a side on which the first air bearing and the second air bearing are disposed on the base surface;

a disc-shaped recording medium;

driving means for driving the disc-shaped recording medium;

swinging means for swinging the suspension along a radius direction of the recording medium; and control means for controlling the drive by the driving means and the swing by the swinging means, wherein an upper most surface of said second air bearing is lower than an upper most surface of said first air bearing, and wherein the plurality of step-faces includes:

a first step-face;

a second step-face higher than the first step-face; and the upper most surface of the first air bearing higher than the second step-face, in this order from the air inflow side.

12. The disc driving device of claim 11, wherein the suspension includes a pivot that applies the given energizing force to the flying head slider, and wherein a pivot place is defined as a place where the pivot of the suspension contacts the flying head slider and when a center of gravity of the head slider and the pivot place are projected onto a face of the disc, the two projected places coincide with each other.

* * * * *